G. F. HARRINGTON AND A. J. PODAWILTZ.
CORPSE CARRYING DEVICE.
APPLICATION FILED AUG. 2, 1920.
1,397,515.
Patented Nov. 22, 1921.
2 SHEETS—SHEET 2.
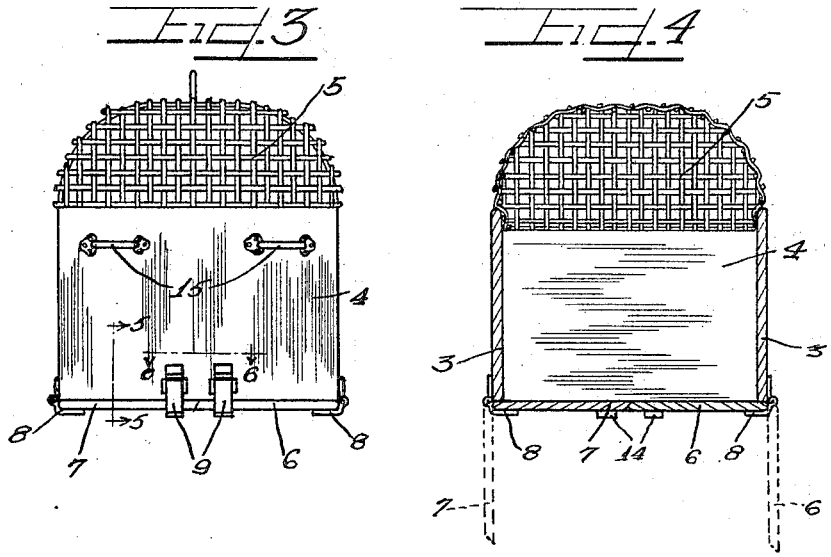
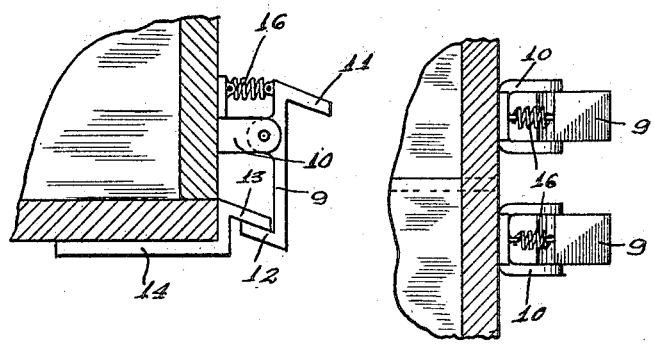
Witnesses
Rudolph J. Berg.
Carlton Hill
Inventors
GEORGE F. HARRINGTON
ARTHUR J. PODAWILTZ.
By Chas. L. Newill Atty.

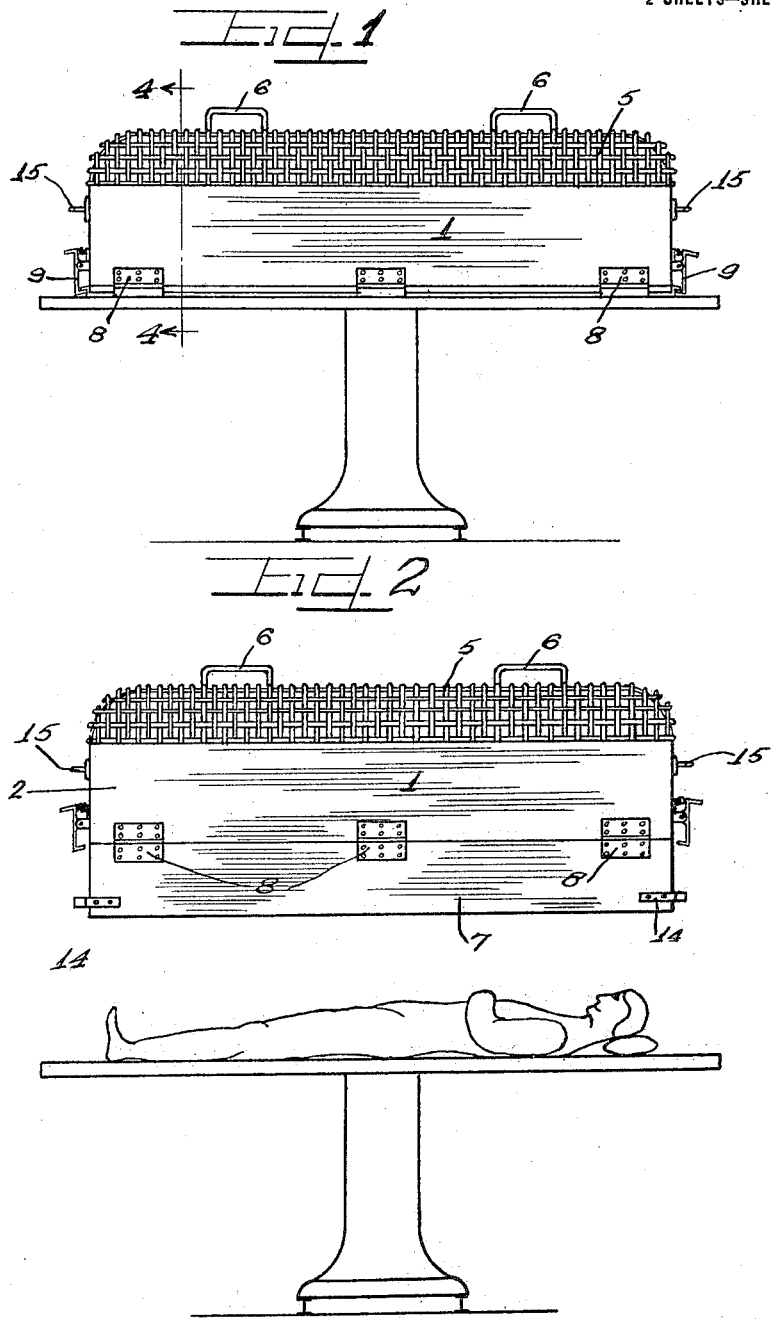

UNITED STATES PATENT OFFICE.

GEORGE F. HARRINGTON AND ARTHUR J. PODAWILTZ, OF EAU CLAIRE, WISCONSIN.

CORPSE-CARRYING DEVICE.

1,397,515.     Specification of Letters Patent.     Patented Nov. 22, 1921.

Application filed August 2, 1920. Serial No. 400,772.

*To all whom it may concern:*

Be it known that we, GEORGE F. HARRINGTON and ARTHUR J. PODAWILTZ, citizens of the United States, and residents of the city of Eau Claire, in the county of Eau Claire and State of Wisconsin, have invented certain new and useful Improvements in Corpse-Carrying Devices; and we do hereby declare that the following is a full, clear, and exact description of the same, reference being had to the accompanying drawings, and to the numerals of reference marked thereon, which form a part of this specification.

Our invention relates more particularly to a basket primarily designed for carrying and handling corpses.

And it has for one of its objects, provisions whereby the corpse or body is let out of the basket without lifting the same therefrom.

It is a further object of our invention to employ releasable pivoted parts in connection with the basket whereby the corpse may be readily removed therethrough.

It is also an object of our invention to embody the same in a novel, practical and easily operated structure as will be more specifically described hereinafter.

Our invention (in a preferred form) is illustrated in the drawings and hereinafter more fully described.

On the drawings:

Figure 1 is a perspective view of our basket on a table before the corpse has been removed.

Fig. 2 is a perspective view thereof after the corpse has been removed through a releasable bottom.

Fig. 3 is an end elevation.

Fig. 4 is a section on the line 4—4 of Fig. 1.

Fig. 5 is an enlarged detail on the line 5—5 of Fig. 3.

Fig. 6 is an enlarged detail on the line 6—6 of Fig. 3.

As shown on the drawings:

Referring now to the different figures of the drawings, in which similar reference numerals refer to similar parts, the numeral 1 illustrates a basket embodying the principles of our invention, and while we have shown the releasable parts at the bottom of the basket, it is obvious that the same may be upon one side thereof. And while we have shown the upper portion constructed of reed and the bottom portion of wood, it is to be understood that this is merely for the purposes of illustration only, and that any suitable material may be used. The basket proper is made of a size suitable to contain a corpse and is preferably constructed of a rectangular box or body portion 2 comprising the two longitudinal side members 3 and the end members 4, which may be secured together in any suitable manner to form the body or box portion. The upper part of the box contains a cover which may assume a variety of forms, but we preferably employ a cover 5 made of woven reed material and supply the same with a pair of handles 6 whereby the same may be easily lifted from the box portion. As shown the cover is designed so that the same fits snugly in the upper portion of the box. The releasable parts of the box, we preferably place at the bottom, and the same may comprise a pair of hinged members 6 and 7, which are respectivelly hinged to the sides of the box by hinges 8 and meet at the center line of the box where the edges thereof are beveled so that the end of one pivoted member slightly overlaps the beveled end of the other. These hinged members 6 and 7 extend the entire length of the basket and are releasably held in closed position by spring pressed latch mechanisms. As shown, this latch mechanism consists of latch members 9 pivoted upon brackets 10 projecting from the ends of the box portion. The upper portion of each latch is provided with a handle 11, and the lower portion with a latch flange 12 adapted to engage the latch catch 13 on a member 14 secured to the bottom of the pivoted member. It should be noted that each pivoted hinged member is provided with a latch catch 13 at each end near the outer edge thereof and each end of the box is provided with a pair of latch members 9 pressed outwardly at their upper ends by springs 16 and designed to have their latch flanges 12 at their lower ends engage under the latch flanges 13, to hold the hinged members 6 and 7 in closed position. These hinged members 6 and 7 in the present instance constitute a door at the bottom of the box. And for the purpose of easily carrying the basket, the same may be provided with handles 15.

In using a basket embodying this invention, it is contemplated that the corpse or body be placed in the basket and the same conveyed to the morgue or undertaking establishment as the case may be, whereupon the basket may be placed upon a table or platform. The hinged members 6 and 7 may be then unlatched to allow the bottom to open up and give up the corpse as the basket is raised, as shown in Fig. 2.

It will thus be observed that our invention embodies a novel structure through which a new function is accomplished, which is simple in construction, easily manipulated and susceptible of various uses.

We are aware that numerous details of construction may be varied through a wide range without departing from the principles of this invention, and we therefore do not purpose limiting the patent granted otherwise than necessitated by the prior art.

We claim as our invention:

1. A corpse carrying device comprising an elongated corpse containing member having a removable cover, a pair of hinged members at the bottom having projecting latch catches, and latch members pivoted on the sides of said corpse containing member and coöperating with said latch catches for removably holding said bottom in closed position.

2. A corpse carrying device comprising an elongated corpse containing member having a removable cover, hinged members closing the bottom of said device, and latch members sustaining the said hinge members and so positioned that they may be released while said corpse containing member is resting on a table, whereby said device may be lifted vertically to remove its contents through the bottom.

3. A corpse carrying device comprising an elongated corpse containing member having a removable cover, and a hinged bottom, and means for removably latching said hinged bottom whereby said device may be vertically lifted to remove its contents upon a table.

In testimony whereof, we have hereunto subscribed our names in the presence of two subscribing witnesses.

GEORGE F. HARRINGTON.
ARTHUR J. PODAWILTZ.

Witnesses:
R. L. JONES,
O. S. DARWIN.